(12) United States Patent
Chuang et al.

(10) Patent No.: US 8,766,532 B2
(45) Date of Patent: Jul. 1, 2014

(54) FLEXIBLE DISPLAY DEVICE AND METHOD FOR USING THE SAME

(75) Inventors: Kai-Cheng Chuang, Hsinchu (TW); Tzu-Ming Wang, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 705 days.

(21) Appl. No.: 12/699,041

(22) Filed: Feb. 3, 2010

(65) Prior Publication Data

US 2010/0270917 A1    Oct. 28, 2010

(30) Foreign Application Priority Data

Apr. 22, 2009   (TW) .............................. 98113382 A

(51) Int. Cl.
*H01L 51/50*   (2006.01)
*H01L 51/52*   (2006.01)

(52) U.S. Cl.
USPC .......................................... 313/505; 313/511

(58) Field of Classification Search
CPC ..... H01L 27/3244; H05B 33/26; H05B 33/28
USPC ............ 313/498–512; 315/169.3; 345/36, 45, 345/76
See application file for complete search history.

(56) References Cited

U.S. PATENT DOCUMENTS

| | | | |
|---|---|---|---|
| 5,714,790 A * | 2/1998 | Sakamoto | 257/440 |
| 6,366,025 B1 * | 4/2002 | Yamada | 315/169.3 |
| 6,570,326 B2 | 5/2003 | Bannai et al. | |
| 7,531,951 B2 * | 5/2009 | Yamanaka | 313/461 |
| 7,737,922 B2 * | 6/2010 | Kim | 345/76 |
| 2002/0008468 A1 * | 1/2002 | Bannai et al. | 313/506 |
| 2004/0164668 A1 * | 8/2004 | Kanno et al. | 313/500 |
| 2005/0156515 A1 * | 7/2005 | Fukase | 313/504 |
| 2005/0205903 A1 | 9/2005 | Hioki | |
| 2006/0186316 A1 * | 8/2006 | Miyashita et al. | 250/208.1 |
| 2007/0228368 A1 * | 10/2007 | Takahashi et al. | 257/40 |
| 2007/0262916 A1 * | 11/2007 | Kee et al. | 345/1.3 |
| 2008/0238306 A1 * | 10/2008 | Takahashi | 313/504 |
| 2010/0127617 A1 * | 5/2010 | Hayafuji et al. | 313/504 |

FOREIGN PATENT DOCUMENTS

| | | |
|---|---|---|
| TW | I262036 | 9/2006 |
| TW | 200844924 A | 11/2008 |

OTHER PUBLICATIONS

Taiwan Official Action issued on Jun. 26, 2013.

\* cited by examiner

*Primary Examiner* — Nimeshkumar Patel
*Assistant Examiner* — Christopher Raabe
(74) *Attorney, Agent, or Firm* — Chun-Ming Shih

(57) ABSTRACT

A flexible electrode array substrate includes a flexible base and a plurality of pixel electrodes. The pixel electrodes are disposed on the flexible base and arranged in an array. The size of one of the pixel electrodes is different from that of another of the pixel electrodes. In addition, another flexible electrode array substrate including a flexible base and a plurality of bar electrodes is also provided. The bar electrodes are disposed on the flexible base and arranged in an array. The size of one of the bar electrodes is different from that of another of the bar electrodes. Besides, a flexible display device having one of the said flexible electrode array substrates is also provided.

6 Claims, 9 Drawing Sheets

FLEXIBLE DISPLAY DEVICE AND METHOD FOR USING THE SAME

This application claims priority to a Taiwan application No. 098113382 filed on Apr. 22, 2009.

BACKGROUND

1. Field of the Invention

The present invention generally relates to a flexible electrode array substrate, and more specifically, to a flexible display device having the above flexible electrode array substrate.

2. Description of The Related Art

With the vigorous growth of information and consumption electronic industries, electronic products such as liquid crystal displays, mobile phones, notebook computers, personal digital assistants and digital cameras and so on, have become an indispensable part of life. Each of the electronic products generally has a display panel which serves as a medium to show images.

The display device having the display panel can be designed to be flexible. However, when the flexible display device is bent, different parts of the flexible display device bear different extension stresses or compression stresses. For example, the middle part of the flexible display device generally bears a relatively large stress so as to deform in large degree, and the marginal part of the flexible display device generally bears a relatively small stress so as to deform in small degree. When the flexible display device is used in a bend state for a long time, the image displayed by the flexible display device in the bend state is distorted. Thus, the quality of the images displayed by the flexible display device in the bend state is bad, and the above problem is worth striving to solve.

BRIEF SUMMARY

The present invention is directed to provide a flexible electrode array substrate which can be applied in a flexible display device so that the image quality of the flexible display device is good when the flexible display is bent.

The present invention is also directed to provide a flexible display device of which the image quality is good when it is bent.

The present invention provides a flexible electrode array substrate including a flexible base and a plurality of pixel electrodes. The pixel electrodes are disposed on the flexible base and arranged in an array. The size of one of the pixel electrodes is different from that of another of the pixel electrodes.

In one embodiment of the present invention, a plurality of first pixel electrode sets are composed of the pixel electrodes. The pixel electrodes of each of the first pixel electrode sets are arranged along a first axis. Each of the pixel electrodes has a first dimension along a second axis. The second axis is perpendicular to the first axis. The first dimensions gradually increase from a central region of the flexible base toward two opposite first edges of the flexible base along the second axis.

In one embodiment of the present invention, a plurality of second pixel electrode sets are composed of the pixel electrodes. The pixel electrodes of each of the second pixel electrode sets are arranged along the second axis. Each of the pixel electrodes has a second dimension along the first axis. The second dimensions gradually increase from the central region of the flexible base toward two opposite second edges of the flexible base along the first axis.

The present invention provides a flexible display device including a flexible electrode array substrate, a display layer and a common electrode. The flexible electrode array substrate includes a flexible base and a plurality of pixel electrodes. The pixel electrodes are disposed on the flexible base and arranged in an array. The size of one of the pixel electrodes is different from that of another of the pixel electrodes. The display layer is disposed on the flexible electrode array substrate. The common electrode is disposed on the display layer.

In one embodiment of the present invention, a plurality of first pixel electrode sets are composed of the pixel electrodes. The pixel electrodes of each of the first pixel electrode sets are arranged along a first axis. Each of the pixel electrodes has a first dimension along a second axis. The second axis is perpendicular to the first axis. The first dimensions gradually increase from a central region of the flexible base toward two opposite first edges of the flexible base along the second axis.

In one embodiment of the present invention, a plurality of second pixel electrode sets are composed of the pixel electrodes. The pixel electrodes of each of the second pixel electrode sets are arranged along the second axis. Each of the pixel electrodes has a second dimension along the first axis. The second dimensions gradually increase from the central region of the flexible base toward two opposite second edges of the flexible base along the first axis.

The present invention provides a flexible electrode array substrate including a flexible base and a plurality of bar electrodes. The bar electrodes are disposed on the flexible base and arranged in an array. The size of one of the bar electrodes is different from that of another of the bar electrodes.

In one embodiment of the present invention, each of the bar electrodes extends along a first axis, and each of the bar electrodes has a first dimension along a second axis. The second axis is perpendicular to the first axis. The first dimensions gradually increase from a central region of the flexible base toward two opposite first edges of the flexible base along the second axis.

The present invention provides a flexible display device including a first flexible electrode array substrate, a display layer and a second flexible electrode array substrate. The first flexible electrode array substrate includes a first flexible base and a plurality of first bar electrodes. The first bar electrodes are disposed on the first flexible base and arranged in an array. The size of one of the first bar electrodes is different from that of another of the first bar electrodes. The display layer is disposed on the first flexible electrode array substrate. The second flexible electrode array substrate is disposed on the display layer. The second flexible electrode array substrate includes a second flexible base and a plurality of second bar electrodes. The second bar electrodes are disposed on the second flexible base and arranged in an array. The direction along which the second bar electrodes are arranged is different from the direction along which the first bar electrodes are arranged. Each of the first bar electrodes overlaps each of the second bar electrodes.

In one embodiment of the present invention, each of the first bar electrodes extends along a first axis, and each of the first bar electrodes has a first dimension along a second axis. The second axis is perpendicular to the first axis. The first dimensions gradually increase from a first central region of the first flexible base toward two opposite first edges of the first flexible base along the second axis.

In one embodiment of the present invention, each of the second bar electrodes extends along the second axis, and each of the second bar electrodes has a second dimension along the first axis. The second axis is perpendicular to the first axis.

The second dimensions gradually increase from a second central region of the second flexible base toward two opposite second edges of the second flexible base along the first axis.

In the embodiment of the present invention, because the size of one of the pixel electrodes (or that of one of the bar electrodes) is different from that of another of the pixel electrodes (or that of another of the bar electrodes), therefore, when the flexible display device having the flexible electrode array substrate is bent such that the sizes of the pixel electrodes (or the sizes of the regions of the bar electrodes overlapping) are substantially the same, the image displayed by the flexible display device in the bend state is not easily distorted. Thus, as compared to the conventional art, the image quality of the flexible display device of the embodiment of the present invention is good when the flexible display device is bent.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

Reference will now be made to the drawings to describe exemplary embodiments of the present display method, in detail. The following description is given by way of example, and not limitation.

Figure 1:
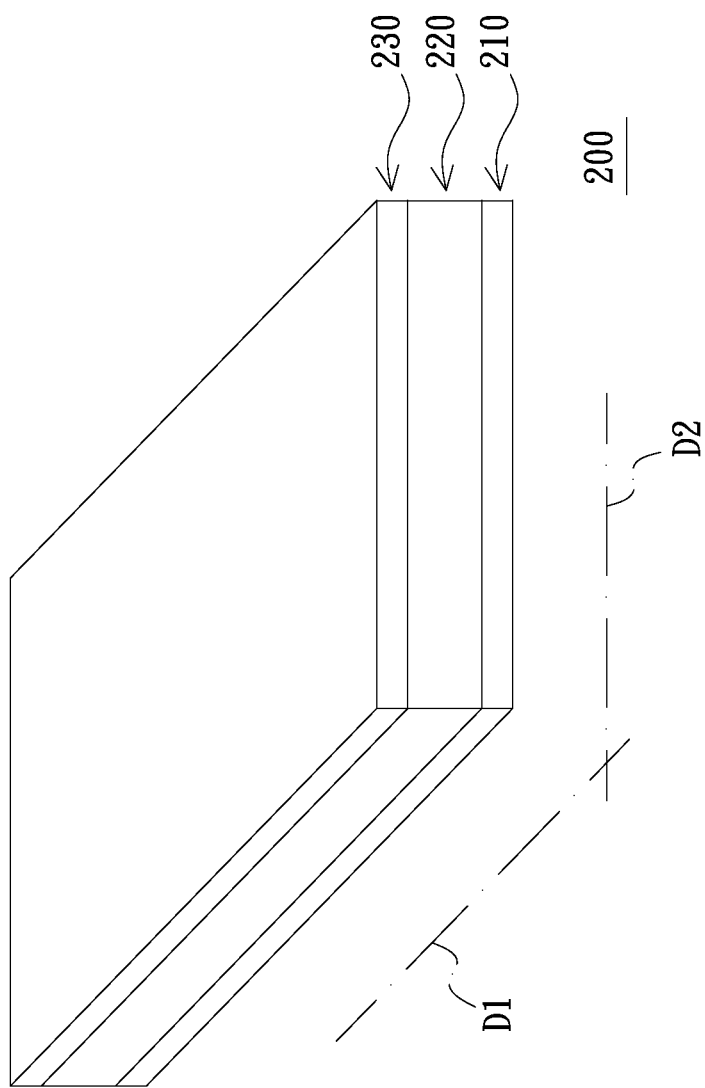
FIG. 1 is a schematic three-dimensional view of a flexible display device of a first embodiment of the present invention.
Figure 2:
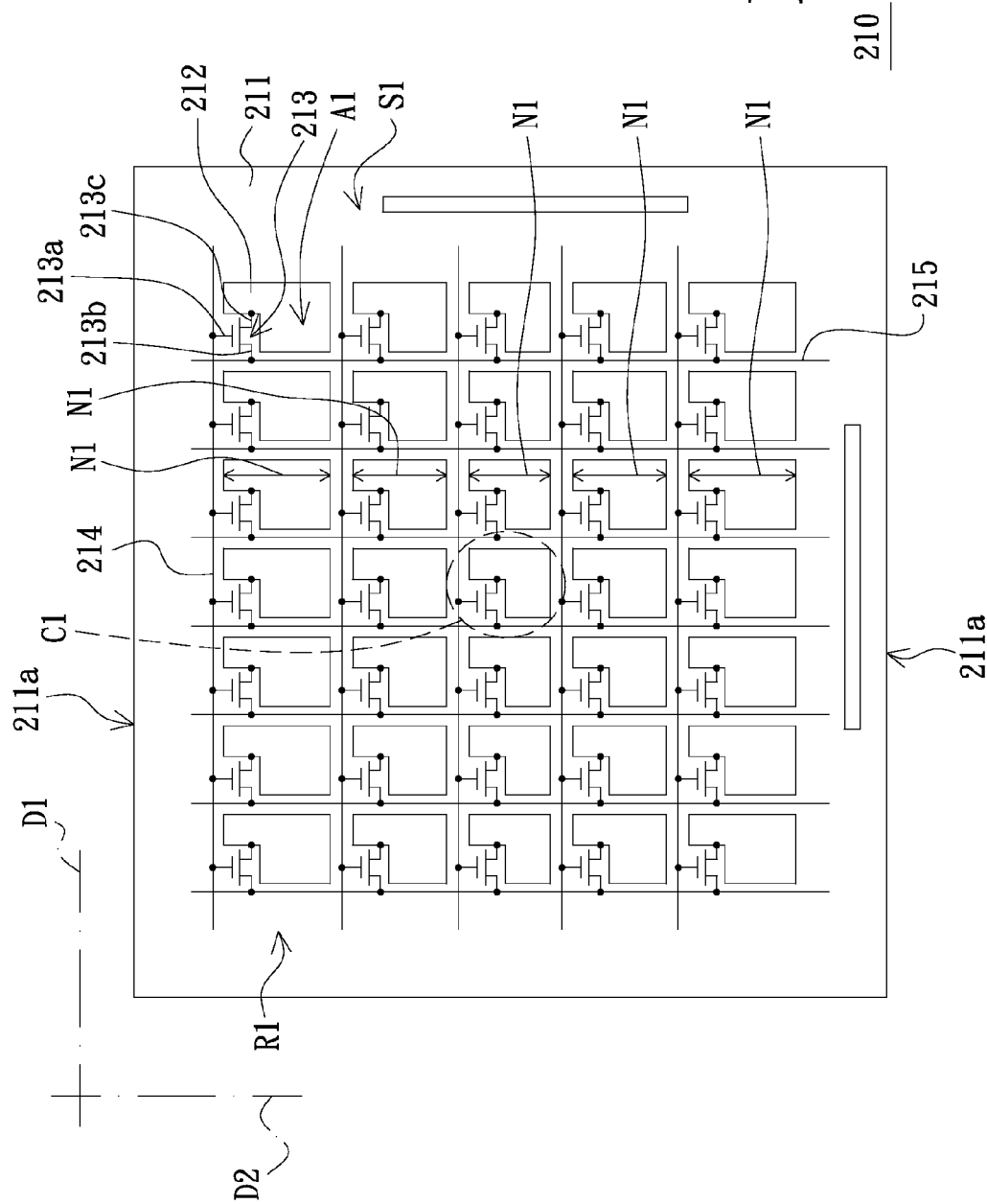
FIG. 2 is a schematic top view of a flexible electrode array substrate of FIG. 1.

FIG. 1 is a schematic three-dimensional view of a flexible display device of a first embodiment of the present invention. FIG. 2 is a schematic top view of a flexible electrode array substrate of FIG. 1. It should be noted that, some components of the flexible electrode array substrate 210 of FIG. 1 is omitted for clarity. Referring to FIGS. 1 and 2, a flexible display device 200 of this embodiment includes a flexible electrode array substrate 210, a display layer 220 and a common electrode 230. The display layer 220 is disposed on the flexible electrode array substrate 210. The display layer 220 of this embodiment, for example, is an electrophoresis layer which has a plurality of microcapsules (not shown) and electrophoretic fluid (not shown) filling each of the microcapsules. The electrophoretic fluid in each of the microcapsules includes a dielectric liquid and a plurality of electrophoretic particles dispersed in the dielectric liquid. In addition, the microcapsules of this embodiment can be replaced by a plurality of microcups. The scope of the present invention is not limited herein.

The common electrode 230 is disposed on the display layer 220. The common electrode 230 is a transparent conductive film made of indium-Tin-Oxide (ITO), for example.

The flexible electrode array substrate 210 includes a flexible base 211, a plurality of pixel electrodes 212, a plurality of driving transistors 213, a plurality of parallel scan lines 214, and a plurality of parallel data lines 215. The pixel electrodes 212, the driving transistors 213, the scan lines 214, and the data lines 215 are disposed on a surface S1 of the flexible base 211. The scan lines 214 are perpendicular to the data lines 215 for dividing into a plurality of pixel unit areas A1. The pixel electrodes 212 are disposed in the pixel unit areas A1 respectively and arranged in an array, and the size of one of the pixel electrodes 212 is different from that of another of the pixel electrodes 212.

The driving transistors 213 are disposed in the pixel unit areas A1. Each of the driving transistors 213 may be a thin film transistor (TFT). A gate 213a of each of the driving transistors 213 is electrically connected to one of the scan lines 214, and a source 213b of each of the driving transistors 213 is electrically connected to one of the data lines 215, and a drain 213c of each of the driving transistors 213 is electrically connected to the corresponding pixel electrode 212. In addition, the display layer 220 is disposed on the surface S1 of the flexible base 211, and the flexible base 211 is made of plastic, for example.

Furthermore, a plurality of first pixel electrode sets R1 are composed of the pixel electrodes 212. The pixel electrodes 212 of each of the first pixel electrode sets R1 are arranged along a first axis D1. Each of the pixel electrodes 212 has a first dimension N1 along a second axis D2. In this embodiment, the second axis D2 is perpendicular to the first axis D1. The first dimensions N1 gradually increase from a central region C1 of the flexible base 211 toward two opposite first edges 211a of the flexible base 211 along the second axis D2.

Figure 3:
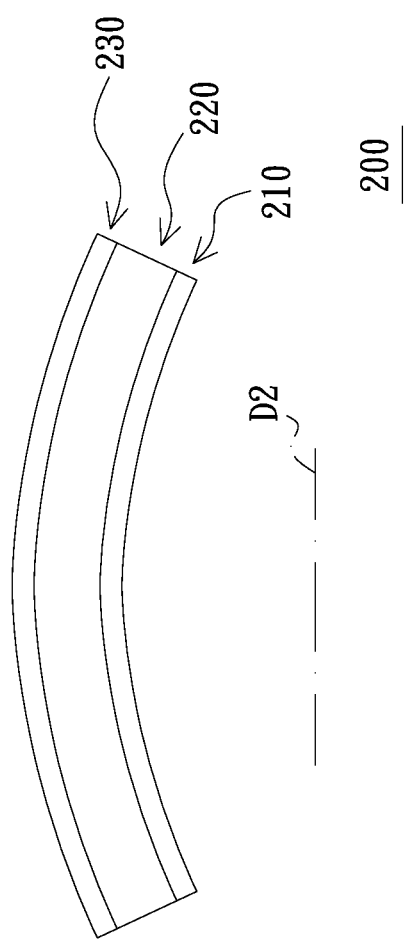
FIG. 3 is a schematic side view of the flexible display device of FIG. 1 which is bent.

FIG. 3 is a schematic side view of the flexible display device of FIG. 1 which is bent. Referring to FIGS. 1, 2 and 3, when the flexible display 200 is bent by a user to stay in a bend state shown in FIG. 3, stresses borne by the flexible electrode array substrate 210 gradually decrease from the central region C1 of the flexible base 211 toward the opposite first edges 211a of the flexible base 211.

Concretely, the first pixel electrode sets R1 adjacent to the first edges 211a of the flexible base 211 bear relatively small stresses so as to deform in relatively small degree such that the first dimension N1 of each of the pixel electrodes 212 thereof increase in relatively small degree. The pixel electrode set R1 located at the central region C1 of the flexible base 211 bears a relatively large stress so as to deform in relatively large degree such that the first dimension N1 of each of the pixel electrodes 212 thereof increase in relatively large degree.

Therefore, when the flexible display device 200 is in the bend state shown in FIG. 3 which is required by the designer, the sizes of the pixel electrodes 212 are substantially the same. When the flexible display device 200 is used in the bend state shown in FIG. 3 for a long time, the image displayed by the flexible display device 200 in the bend state is not easily distorted. Thus, as compared to the conventional art, the image quality of the flexible display device 200 of the embodiment is good when the flexible display 200 is bent.

Figure 4:
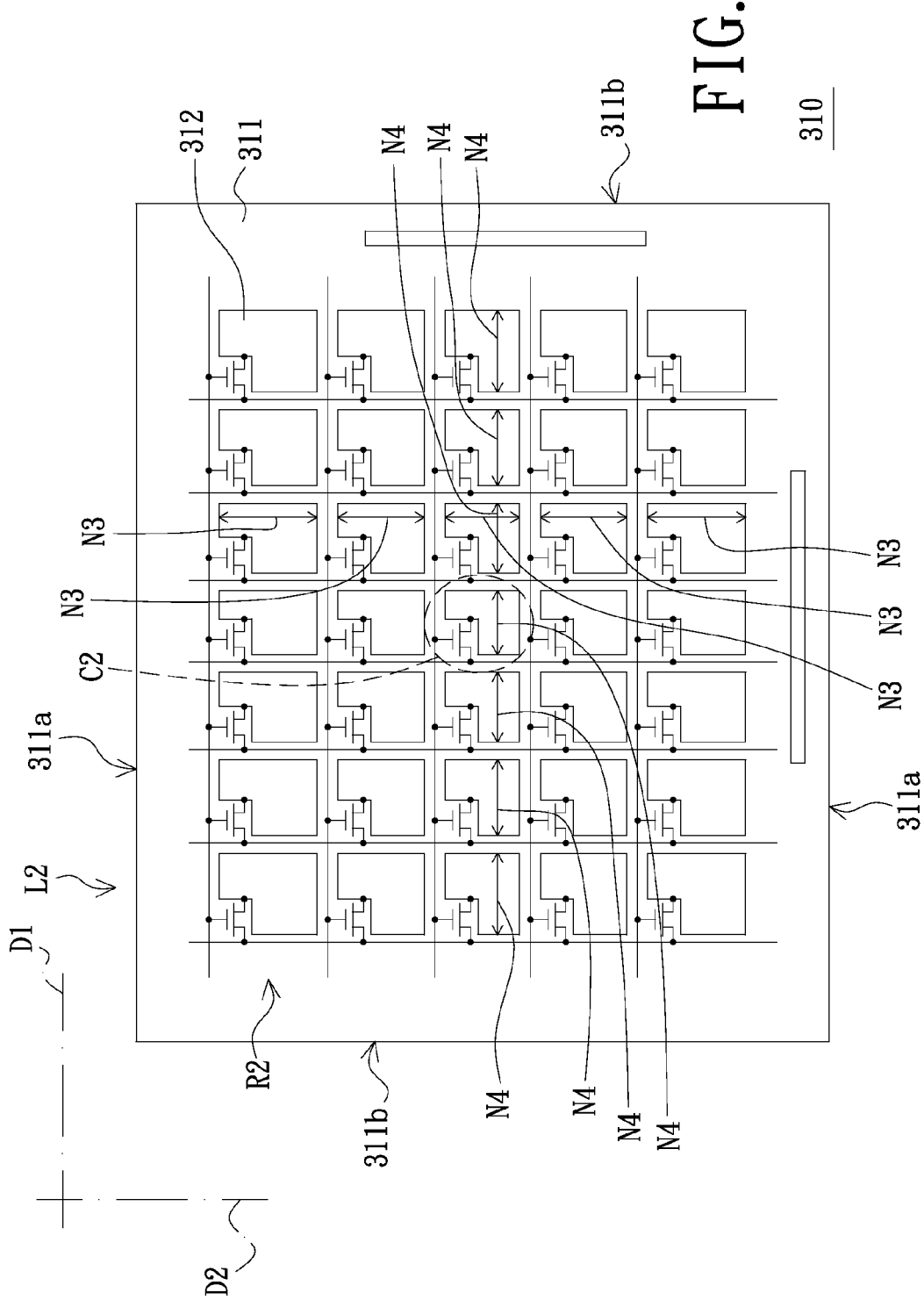
FIG. 4 is a schematic top view of a flexible electrode array substrate of a second embodiment of the present invention.

FIG. 4 is a schematic top view of a flexible electrode array substrate of a second embodiment of the present invention. Referring to FIG. 4, the flexible electrode array substrate 310 of this embodiment is different from the flexible electrode array substrate 210 of the first embodiment.

In this embodiment, a plurality of first pixel electrode sets R2 are composed of the pixel electrodes 312. The pixel electrodes 312 of each of the first pixel electrode sets R2 are arranged along the first axis D1. Each of the pixel electrodes 312 has a first dimension N3 along the second axis D2. The first dimensions N3 gradually increase from the central region C2 of the flexible base 311 toward two opposite second edges 311a of the flexible base 311 along the second axis D2.

In addition, a plurality of second pixel electrode sets L2 are composed of the pixel electrodes 312. The pixel electrodes 312 of each of the second pixel electrode sets L2 are arranged along the second axis D2. Each of the pixel electrodes 312 has a second dimension N4 along the first axis D1. The second dimensions N4 gradually increase from the central region C2 of the flexible base 311 toward two opposite second edges 311b of the flexible base 311 along the first axis D1.

Figure 5:
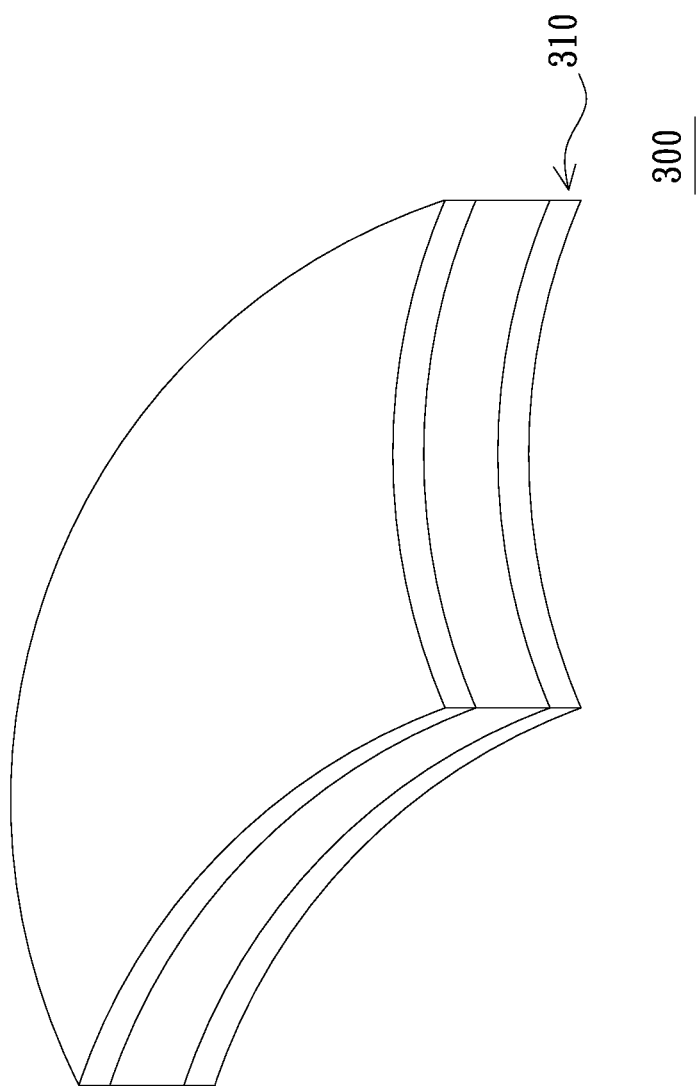
FIG. 5 is a schematic three-dimensional view of a flexible display device which has the flexible electrode array substrate of FIG. 4 and is bent.

FIG. 5 is a schematic three-dimensional view of a flexible display device which has the flexible electrode array substrate of FIG. 4 and is bent. Referring to FIGS. 4 and 5, when the flexible display 300 is bent by a user to stay in a bend state shown in FIG. 5, stresses borne by the flexible electrode array substrate 310 gradually decrease from the central region C2 of the flexible base 311 toward the opposite first edges 311a of the flexible base 311. In addition, stresses borne by the flexible electrode array substrate 310 also gradually decrease from the central region C2 of the flexible base 311 toward the opposite second edges 311b of the flexible base 311.

Therefore, when the flexible display 300 is in the bend state shown in FIG. 5 which is required by the designer, the sizes of the pixel electrodes 312 are substantially the same. If the flexible display 300 is used in the bend state shown in FIG. 5 for a long time, the image displayed by the flexible display 300 in the bend state is not easily distorted. Thus, as compared to the conventional art, the image quality of the flexible display 300 of the embodiment is good when the flexible display 300 is bent.

Figure 6:
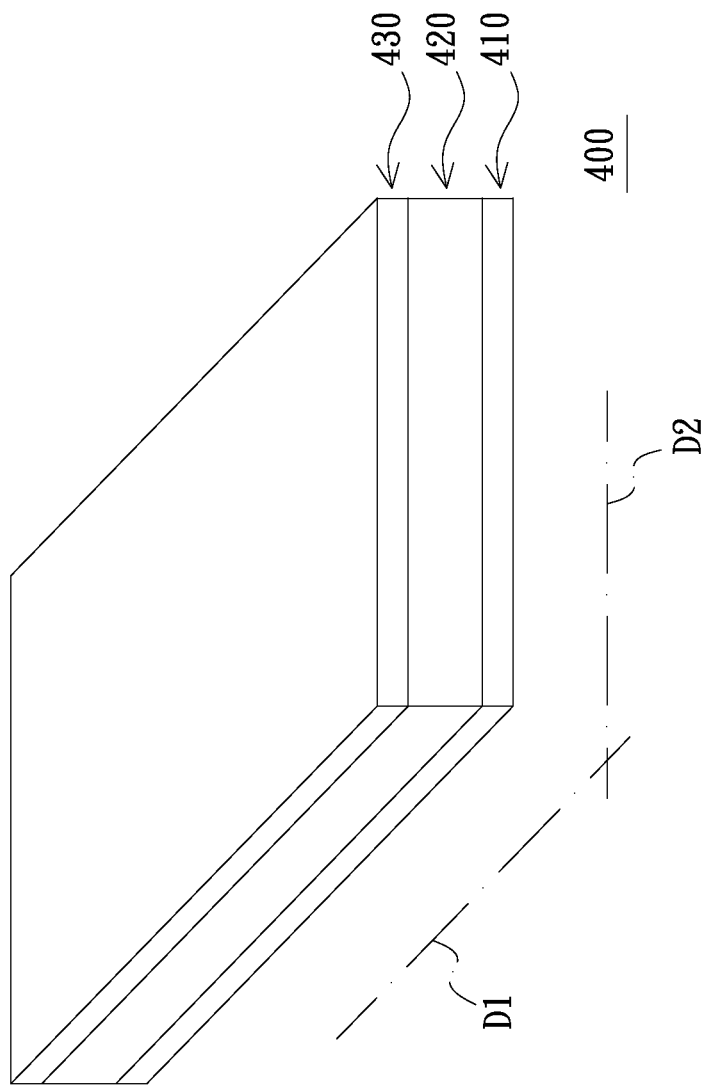
FIG. 6 is a schematic three-dimensional view of a flexible display of a third embodiment of the present invention.
Figure 7:
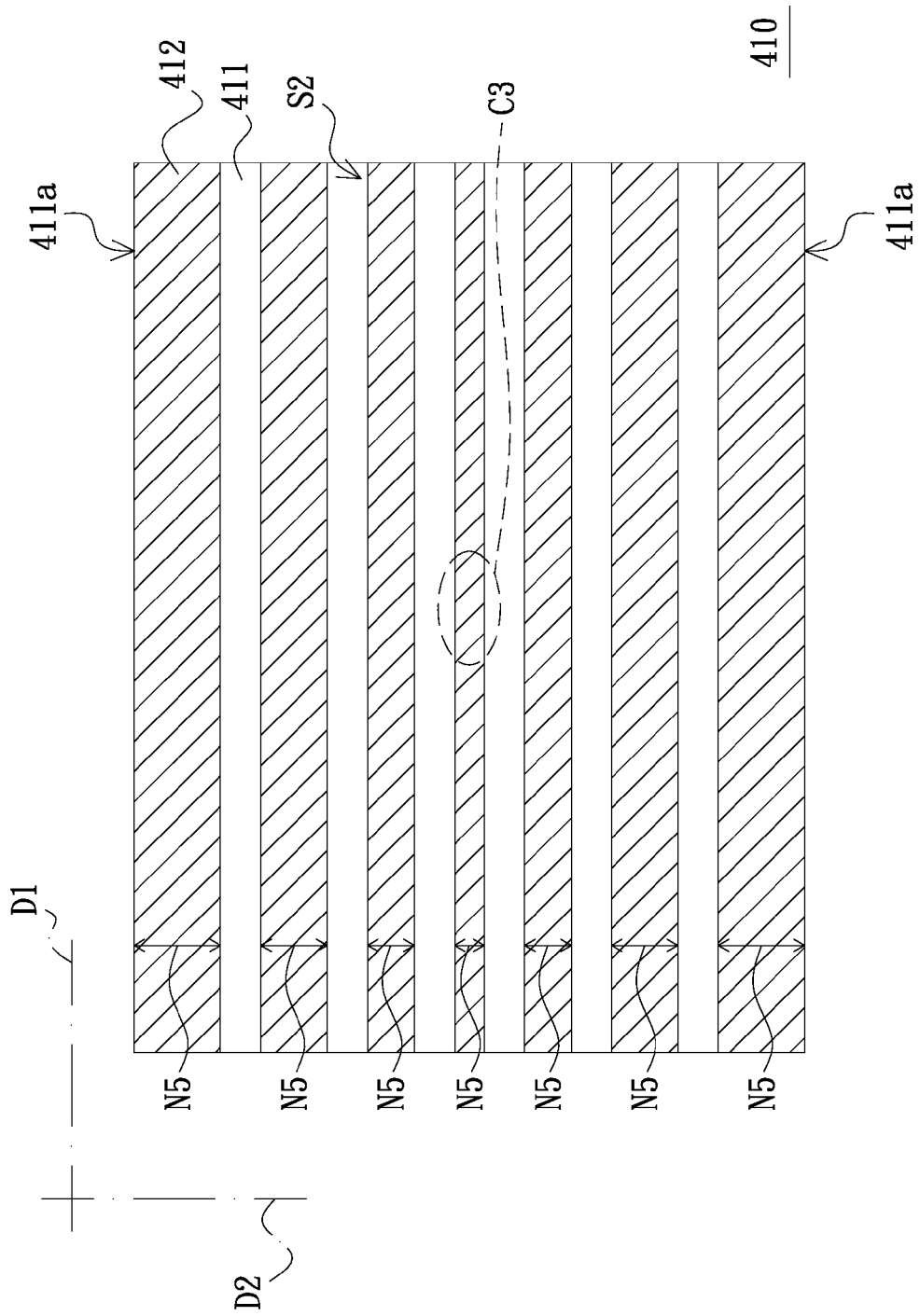
FIG. 7 is a schematic top view of a first flexible electrode array substrate of FIG. 6.
Figure 8:
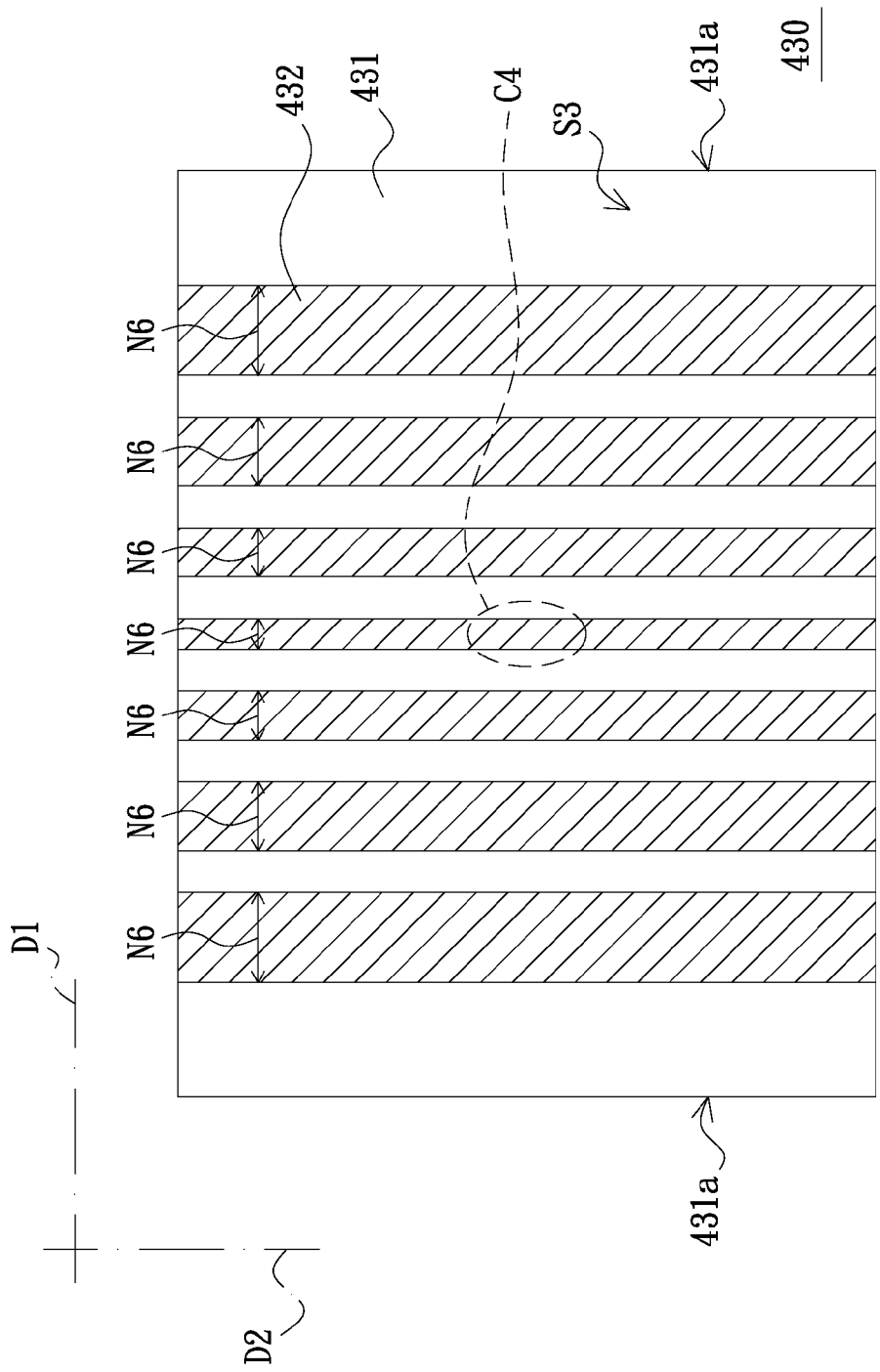
FIG. 8 is a schematic top view of a second flexible electrode array substrate of FIG. 6.

FIG. 6 is a schematic three-dimensional view of a flexible display of a third embodiment of the present invention. FIG. 7 is a schematic top view of a first flexible electrode array substrate of FIG. 6. FIG. 8 is a schematic top view of a second flexible electrode array substrate of FIG. 6. It should be noted that, some components of the first flexible electrode array substrate 410 of FIG. 6 is omitted for clarity, and some components of the second flexible electrode array substrate 430 of FIG. 6 is omitted for clarity. Referring to FIGS. 6, 7 and 8, a flexible display 400 of this embodiment includes a first flexible electrode array substrate 410, a display layer 420 and a second flexible electrode array substrate 430.

The first flexible electrode array substrate 410 includes a first flexible base 411 and a plurality of first bar electrodes 412. The first flexible base 411 is made of plastic, for example. The first bar electrodes 412 are disposed on a surface S2 of the first flexible base 411 and arranged in an array. The size of one of the first bar electrodes 412 is different from that of another of the first bar electrodes 412.

Furthermore, each of the first bar electrodes 412 extends along the first axis D1, and each of the first bar electrodes 412 has a first dimension N5 along the second axis D2. The second axis D2 is perpendicular to the first axis D1. The first dimensions N5 gradually increase from a first central region C3 of the first flexible base 411 toward two opposite first edges 411a of the first flexible base 411 along the second axis D2.

The second flexible electrode array substrate 430 is disposed on the display layer 420. The second flexible electrode array substrate 430 includes a second flexible base 431 and a plurality of second bar electrodes 432. The second flexible base 431 is made of plastic, for example. The second bar electrodes 432 are disposed on a surface S3 of the second flexible base 431 and arranged in an array, and the size of one of the second bar electrodes 432 is different from that of another of the second bar electrodes 432. The direction along which the second bar electrodes 432 are arranged, i.e., the first axis D1, is different from the direction along which the first bar electrodes 412 are arranged, i.e., the second axis D2. In this embodiment, the direction along which the second bar electrodes 432 are arranged is perpendicular to the direction along which the first bar electrodes 412 are arranged.

Furthermore, each of the second bar electrodes 432 extends along the second axis D2, and each of the second bar electrodes 432 has a second dimension N6 along the first axis D1. The second dimensions N6 gradually increase from a second central region C4 of the second flexible base 431 toward two opposite second edges 431a of the second flexible base 431 along the first axis D1.

In addition, the display layer 420 is disposed between the surface S2 of the first flexible base 411 of the first flexible electrode array substrate 410 and the surface S3 of the second flexible base 431 of the second flexible electrode array substrate 430. It should be noted that, in the flexible display 400 of this embodiment, the surface S2 of the first flexible base 411 faces the surface S3 of the second flexible base 431 of the second flexible electrode array substrate 430. A plurality of pixel unit areas are the regions of the first bar electrodes 412 overlapping the second bar electrodes 432.

Figure 9:
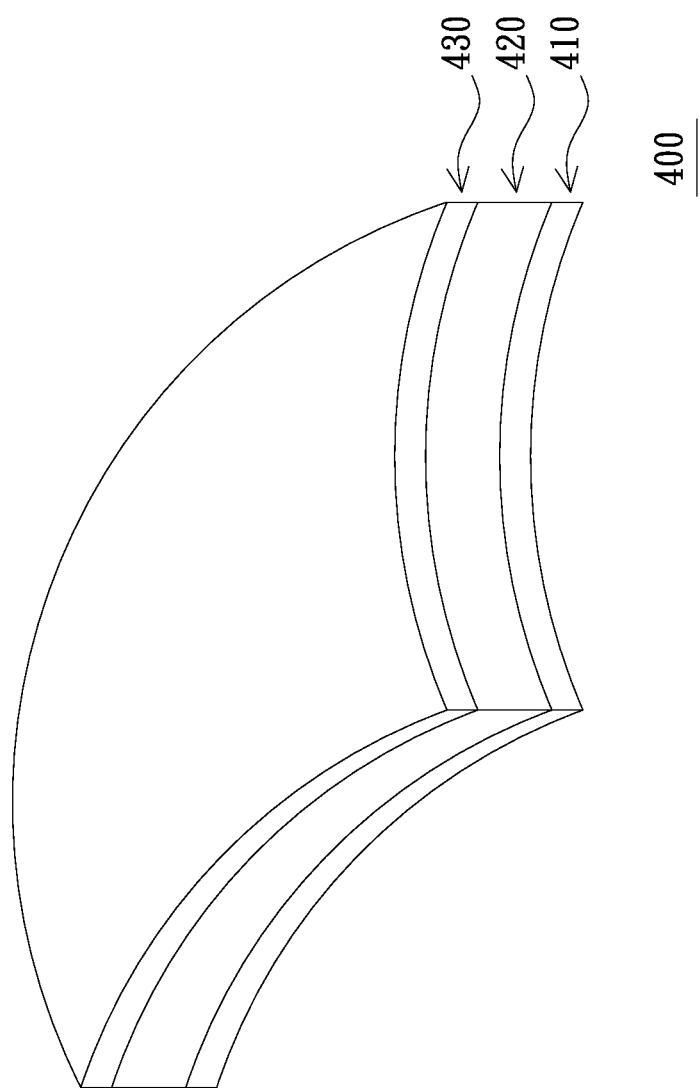
FIG. 9 is a schematic three-dimensional view of the flexible display device of FIG. 6 which is bent.

FIG. 9 is a schematic three-dimensional view of the flexible display device of FIG. 6 which is bent. Referring to FIGS. 6, 7, 8 and 9, when the flexible display device 400 is bent by a user to stay in a bend state shown in FIG. 9, the sizes of the regions of the first bar electrodes 412 overlapping the second bar electrodes 432 are substantially the same. When the flexible display 400 is used in the bend state shown in FIG. 9 for a long time, the image displayed by the flexible display 400 in the bend state is not easily distorted. Thus, as compared to the conventional art, the image quality of the flexible display 400 is good when the flexible display 400 is bent.

As mentioned above, the flexible electrode array substrate and the flexible display device having the same of the embodiment of the present invention have at least one of the following advantages or other advantages. In the embodiment of the present invention, because the size of one of the pixel electrodes (or that of one of the bar electrodes) of the flexible electrode array substrate is different from that of another of the pixel electrodes (or that of another of the bar electrodes), therefore, when the flexible display device having the flexible electrode array substrate is bent such that the sizes of the pixel electrodes (or the sizes of the regions of the bar electrodes overlapping) are substantially the same, the image displayed by the flexible display device in the bend state is not easily distorted. Thus, as compared to the conventional art, the image quality of the flexible display device of the embodiment of the present invention is good when the flexible display device is bent.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flexible display device, comprising:
   a flexible electrode array substrate, comprising:
      a flexible base; and
      a plurality of pixel electrodes disposed on the flexible base and arranged in an array, wherein the size of one of the pixel electrodes is different from the size of another of the pixel electrodes, a plurality of first pixel electrode sets are composed of the pixel electrodes, the pixel electrodes of each of the first pixel electrode sets are arranged along a first axis, each of the pixel electrodes has a first dimension along a second axis, the second axis is perpendicular to the first axis, and the first dimensions gradually increase from a central region of the flexible base toward two opposite first edges of the flexible base along the second axis;
   a display layer disposed on the flexible electrode array substrate; and
   a common electrode disposed on the display layer,
   wherein the flexible electrode array substrate is adapted to be bent to form two curved surfaces at opposite sides so that the sizes of the pixel electrodes are substantially the same to prevent an image displayed by the flexible display device from being distorted.

2. The flexible display device as claimed in claim 1, wherein a plurality of second pixel electrode sets are composed of the pixel electrodes, the pixel electrodes of each of the second pixel electrode sets are arranged along the second axis, each of the pixel electrodes has a second dimension along the first axis, and the second dimensions gradually increase from the central region of the flexible base toward two opposite second edges of the flexible base along the first axis.

3. A flexible display device, comprising:
   a first flexible electrode array substrate, comprising:
      a first flexible base; and
      a plurality of first bar electrodes disposed on the first flexible base and arranged in an array, wherein the size of one of the first bar electrodes is different from the size of another of the first bar electrodes, each of the first bar electrodes extends along a first axis, each of the first bar electrodes has a first dimension along a second axis, the second axis is perpendicular to the first axis, and the first dimensions gradually increase from a first central region of the first flexible base toward two opposite first edges of the first flexible base along the second axis;
   a display layer disposed on the first flexible electrode array substrate; and
   a second flexible electrode array substrate disposed on the display layer, comprising:
      a second flexible base; and
      a plurality of second bar electrodes disposed on the second flexible base and arranged in an array, wherein the direction along which the second bar electrodes are arranged is different from the direction along which the first bar electrodes are arranged, and each of the first bar electrodes overlaps each of the second bar electrodes, each of the second bar electrodes extends along the second axis, each of the second bar electrodes has a second dimension along the first axis, the second dimensions gradually increase from a second central region of the second flexible base toward two opposite second edges of the second flexible base along the first axis,
   wherein the first flexible electrode array substrate and the second flexible electrode array substrate are adapted to be bent to form curved surfaces at periphery thereof so that the sizes of regions of the first bar electrodes overlapping with the second bar electrodes are substantially the same to prevent an image displayed by the flexible display device from being distorted.

4. The flexible display device as claimed in claim 1, wherein a plurality of second pixel electrode sets are composed of the pixel electrodes, the pixel electrodes of each of the second pixel electrode sets are arranged along the second axis, each of the pixel electrodes has a second dimension along the first axis, and all of the second dimensions are the same.

5. A method for using the flexible display device as claimed in claim 1, comprising:
   bending the flexible display device to make the sizes of the pixel electrodes be substantially the same to prevent an image displayed by the flexible display device from being distorted.

6. A method for using the flexible display device as claimed in claim 3, comprising:
   bending the flexible display device to make the sizes of regions of the first bar electrodes overlapping with the second bar electrodes be substantially the same to prevent an image displayed by the flexible display device from being distorted.

* * * * *